United States Patent
Faist (10) Patent No.: US 8,838,776 B2
(45) Date of Patent: Sep. 16, 2014

(54) METHOD FOR THE AUTOMATIC TIME SYNCHRONISATION OF DEVICES IN NETWORK-BASED SYSTEMS

(75) Inventor: Fridolin Faist, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 470 days.

(21) Appl. No.: 12/194,057

(22) Filed: Aug. 19, 2008

(65) Prior Publication Data
US 2009/0083444 A1   Mar. 26, 2009

Related U.S. Application Data (60) Provisional application No. 60/975,320, filed on Sep. 26, 2007.

(51) Int. Cl.
*G06F 15/173* (2006.01)
*G06F 1/14* (2006.01)
*G05B 19/042* (2006.01)

(52) U.S. Cl.
CPC .... *G05B 19/042* (2013.01); *G05B 2219/25479* (2013.01); *G05B 2219/25478* (2013.01); *G06F 1/14* (2013.01)
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 6,714,160 B2* | 3/2004 | McBurney | ............... | 342/357.62 |
| 7,228,417 B2* | 6/2007 | Roskind | ................ | 713/168 |
| 7,574,500 B2* | 8/2009 | Roddy | ................ | 709/223 |
| 2003/0103486 A1* | 6/2003 | Salt et al. | ................ | 370/350 |
| 2006/0059270 A1* | 3/2006 | Pleasant et al. | ................ | 709/237 |
| 2006/0155495 A1* | 7/2006 | Osorio et al. | ................ | 702/89 |
| 2008/0079596 A1* | 4/2008 | Baier et al. | ................ | 340/679 |
| 2008/0147845 A1* | 6/2008 | Yoda et al. | ................ | 709/224 |
| 2009/0037972 A1* | 2/2009 | Pontual et al. | ................ | 725/133 |

FOREIGN PATENT DOCUMENTS

CN   1 794 855   6/2006

OTHER PUBLICATIONS

Booch et al., " The unified modeling language userguide" Oct. 20, 1998, First Edition, ISBN: 0-201-57168-4, 3 sheets.

\* cited by examiner

*Primary Examiner* — Alicia Baturay
(74) *Attorney, Agent, or Firm* — Fay Kaplun & Marcin, LLP (57) ABSTRACT

A method is based on a communication- and data network for the automatic time synchronization of field devices, namely fill-level measuring devices and pressure measuring devices as well as field-device control units. The method comprises the steps of: determining a current time value by the field device or by the field-device control unit, and providing a desired value in a central server. Furthermore, the method comprises the following steps: comparing the current time value with the desired value, and setting the current time value to the desired value when the desired value differs from the current time value by more than a predetermined threshold value.

22 Claims, 5 Drawing Sheets

| Devicenetwork data | |
|---|---|
| Acces data | |
| *Acces type | Telephone |
| *Network address | 192.168.200.200 |
| *Telephone no. | 01726417256124 |
| Devicedata | |
| *Device name | MET624 GSM |
| Day | MET624 GSM |
| Type | VEGAMET 624 |
| Serial number | 14073261 |
| Software version | 1.76/22 |
| *Time zone | (GMT+01:00)Amsterdam, Berlin, Be |
| Transmission interval | (GMT+01:00)Amsterdam, Berlin, Be<br>(GMT+01:00)West Central Africa<br>(GMT+02:00)Minsk<br>(GMT+02:00)Cairo |
| Created on | (GMT+02:00)Helsinky, Kyiv, Riga, S<br>(GMT+02:00)Athens, Bucharest, Ist |
| Last change | (GMT+02:00)Jerusalem<br>(GMT+02:00)Harare, Pretoria<br>(GMT+03:00)Moskow, St. Petersbur<br>(GMT+03:00)Kuwait, Riyadh<br>(GMT+03:00)Nairobi |

| Message type | Web-W ▼ |
|---|---|
| Event type | Time-controlled ▼ |
| Message content | Web-W ▼ |

Fig. 7

| Trigger sending | Time interval ▼ |
|---|---|
| Sending takes place every | 1 ▼ Hour(s) |
| | ☐ throughout the day |
| | from 08:00 ▼ to 18:00 ▼ |

METHOD FOR THE AUTOMATIC TIME SYNCHRONISATION OF DEVICES IN NETWORK-BASED SYSTEMS

PRIORITY CLAIM

This application claims the benefit of the filing date of U.S. Provisional Patent Application Ser. No. 60/975,320 filed on 26 Sep. 2007, the disclosure of which application is hereby incorporated herein by reference.

FIELD OF THE INVENTION

The present invention relates to a method for the automatic time synchronisation of field devices in network-based systems, to a network-based measuring system for the automatic time synchronisation, to a computer program for the automatic time synchronisation of field devices, to a storage medium on which a computer program for the automatic time synchronisation of field devices is stored, and to a microprocessor comprising such a computer program.

BACKGROUND INFORMATION

If one intends to use a device network that can globally be very far-reaching to the effect that time-critical data of the distributed devices is to be centrally compared and stored, then a uniform time base may be imperative. If these are device-/server systems with servers which are to receive and archive measured-value information and device information with time stamp information from their devices, then this uniform time base may be essential. This may be the case in particular when the devices or clients are to collect information, for example measured-value information, over an extended period of time, and are to forward such information at a suitable point in time block-by-block to the server.

Typically, these days a time server is cyclically contacted for the automatic synchronisation, on an worldwide uniform time base, of computers that have access to the internet. A time server may usually be synchronised by an ultra-precise time-of-day clock or by several other time servers.

For this method to function, each computer that is to use this service should be set up specially for using a time server. This is manually carried out on site at each individual device, and in the case of worldwide distribution of the devices can involve significant work effort with significant potential sources of errors in relation to a uniform time base. If one wishes to make use of this option for control units or field devices from the area of process automation, one realises that personnel putting the devices into operation are often over-taxed with these necessary settings and systems because said personnel simply don't have the necessary know-how. Likewise, this approach is expensive and it cannot be ensured that during ongoing operation operating errors do not occur, which operating errors lead to alteration of the time base or to the set time server no longer being available. Furthermore, over years of operation a time drift can occur in the clocks used, because the time-keeping precision of clocks over time always has technical limitations. Moreover, hitherto-known methods are only to be set as an option; in the case of human error or omission by the setting-up personnel during set-up of the time server, the time information of the measured-value information is not usable and not comparable.

SUMMARY OF THE INVENTION

In the following text the terms client, measuring device or evaluation device are used so that they have the same meaning as the term field device, wherein all the exemplary embodiments of the present invention can always also refer to a multitude of field devices and field device control systems. Finally, the present invention may be implemented for each and every technical device that can acquire data and that comprises a clock.

According to an exemplary embodiment of the present invention, a method based on a communication- and data network for the automatic time synchronisation of field devices, namely fill-level measuring devices, pressure measuring devices as well as field-device control units is stated. In this arrangement a current time value is determined by the field device or the field-device control unit, and a desired value is provided in a central server or to a central server. Apart from a comparison of the current time value with the desired value being carried out in the method, the current time value is also set to the desired value if the desired value differs from the current time value by more than a predetermined threshold value.

This may provide for simplified synchronisation of the time base of worldwide distributed field devices or field-device control units in process automation by means of a time server.

In order to achieve ensured and automated synchronisation of the time base of control units and field devices distributed worldwide, the time of a field device is thus centrally controlled and if need be synchronised by the server at any desired location. This may take place automatically because both in the case of communication initiated by the field device, and in the case of communication initiated by the server, communication for time synchronisation is more or less regularly triggered. Activation of the entire method within the evaluation device or within the server thus corresponds to the running of user software.

In this arrangement generating so-called time comparison data by means of at least one field device corresponds to the process of determining a current time value. The method according to the invention may thus automatically ensure that at settable regular intervals, which can, for example, be pre-defined by the user, a uniform time base is present at the server and at the field device. Since the field devices on the works side or on the server side are centrally set to their respective time zones, and since the server knows the time zone in which the device is located, it may thus be possible to centrally compare, and if required combine, data from field devices that are distributed worldwide, which data is time-critical (data in which the acquisition time plays an important role). In this arrangement the server may ensure that correct conversion of the current time of day of a field device to the works time zone or server time zone is carried out. In this way, all the above-mentioned error potentials for comparing time-critical measured-value data generated worldwide may be prevented or reduced, and natural time drift of each individual field device may be counteracted. Since both the server side and the field devices or the field-device control units are equipped to establish contact with the respective counterpart, communication for time synchronisation may be initiated by either side.

In order to make time synchronisation possible, the method according to the invention is based on a data- and communication network. In other words the server, the field devices and the field-device control units are integrated in this network. Such data- and communication networks are, for example, net-based, internet-based, web-based, network-based, or based on a browser-supported network.

Apart from checking and correcting the current time of a field device or of a field-device control unit, the method may also provide checking and correction, on the server side, of the time zones in the respective field device or in the respective control unit. By way of this dual checking by the server via the globally distributed external devices, maintenance of the synchronicity of all the external devices involved may be ensured in relation to one another and to the server, taking into account the respective time zones.

In addition, this method may also include the field device being requested by the server, by means of the communication connection, to carry out a comparison of clocks. In the description of the figures later in this document, there is a description of a subsequent process chain that is triggered by such a request from the server.

In order to improve the safe and reliable performance of the method according to an exemplary embodiment of the present invention, during each transmission between the server and the field device and between the field device and the server, transmission of the time information is prescribed and ensured by the method.

Thus, a procedure of time synchronisation within normal operation and within the usually permanently ongoing process of the device is implemented.

In this arrangement it is particularly important that the current time value in the field device is converted or adapted, because, by way of the method according to the invention, this field device is to be kept synchronous with the server and thus synchronous with all the other field devices in the multi-unit system.

The exemplary embodiments of the method, which exemplary embodiments are presented below, may be carried out by the measuring system according to the invention, by the computer program and by the microprocessor, or they may be stored on the storage medium.

According to a further exemplary embodiment of the present invention, the method involves the step of taking over data from the field device or from the field-device control unit by the server into a database. In this process this step is carried out only if the desired value differs from the current time value at most by the predetermined threshold value.

The method according to the invention may thus ensure that it is possible for the server to take over data from the field device only after it has been ensured that the times and the time base in the server and in the field device are identical. If thereafter any desired combinations of data stored on the server are to be used for display or further processing, the user may be sure that even the data that has been transmitted from different locations worldwide to the server and that has been stored on the server can be compared with the desired accuracy relating to time. Thus, forwarding stored data by the server to higher-order processing instances or processing tools may be non-critical in relation to the time information associated with the respective data. The server is thus used for central distribution of time information to the field devices and to the field-device control units, and is thus available as an advantageous alternative to time management of field devices at the respective location of the device, which time management has hitherto been carried out manually.

In this arrangement, data can be present in any desired file format, for example in an XML-file format. Furthermore, the data- and communication network may ensure data transmission, including transmission of individual files and block-by-block transmission of files for synchronisation.

According to a further exemplary embodiment of the present invention, transmitting the current time value from the field device to the server, and determining the time difference between the current time value and the desired value takes place by means of the method.

The field devices thus furnish time information, which can, for example, be present in the XML-structure <Device> in order to furnish the current time of day in the evaluation device, i.e. at the point in time of the data exchange with the server. The current time value or this time information or this time comparison data can be prepared and transmitted in any desired file format, provided that with it a comparison with the desired value can take place on the server. Apart from the device name, device type, version, serial number, and the IP-address of the device, this time comparison data also contains the significant current time of the field device at the location of the field device, including the date. The element "Device" of the XML-measured-value data comprises, for example, the following data: <Device tag="My MET", type="VEGA Scan 693", version="1.75/12", serial="11111111", IP address="172.16.40.4", Time="2006-07-26, 10:38:38">. In certain cases, purely for the purpose of time synchronisation, this time comparison data or the XML-element "Device" can also be sent without the measured-value information. This may then merely ensure synchronicity between the server and the field device.

According to a further exemplary embodiment of the present invention, the server additionally sends a reply to the field device, stating that the system time of the field device is OK if the desired value differs from the current time value at most by the predetermined threshold value. Likewise, in a further step all the data to be stored is transmitted by the field device to the server, and in a further step the server acknowledges receipt of the data.

The method according to this exemplary embodiment of the present invention may thus ensure that data that was transmitted from the field device to the server by way of the communication network can only be stored on the server if the time of the field device immediately beforehand has been automatically adjusted to the time of the server. In other words, only if synchronicity and an identical time base between all the field devices and the server are present is may be possible to store data on the server side. In this process, both block-by-block transmission of data and individual sequential transmission of data through the data- and communication network may be possible. In this process, transmission can be implemented by an http-protocol, in which process acknowledgment or confirmation in the case of receipt of data is issued by the server by means of an http-status 200. The following applies to this and to every further exemplary embodiment of the present invention: synchronisation or initiation of this synchronisation may be initiated both automatically by the server or by the field device or by the field-device control unit; however, an instant request by the user to start the process immediately may be possible at any time. This represents an additional and alternative measure for safe and reliable performance within the method according to the invention.

According to a further exemplary embodiment of the present invention, the method further comprises the transmission of a server time to the field device, and the issue of a request for time synchronisation of the field device with the server. Likewise, storing the process of "Time synchronisation in the field device" in a message buffer on the server forms part of this exemplary embodiment.

If the method for ensuring the time base and correct setting of the time zone in the respective field device detects the need for synchronisation, the server transmits its time to the field device. In this way any error on the side of the evaluation device or of the field device, as far as the current time or the setting of the time zone is concerned, may have thus been rectified. This is registered by storing this procedure in a message buffer on the server, i.e. in a database that is designed especially for this purpose.

According to a further exemplary embodiment of the present invention, the method according to the invention is implemented in the acquisition system WEB-VV. WEB-VV is an interface between measurement devices on one side and users on the other side. It is implemented in the form of a WEB-VV server and a corresponding software tool. Information about WEB-VV can be found on the VEGA homepage.

The method according to the invention can, for example, be implemented and used in the web-based measured-value acquisition- and visualisation system WEB-VV. In this arrangement WEB-VV, which system is then used as the server, receives its measured-value information with associated time stamps from a multitude of evaluation devices as a file (for example an XML-file) and stores this file centrally in a database that is designed for this purpose. The stored data can be combined as required in the WEB-VV server, and can be displayed, by way of browser access, as so-called measured-value displays, or can be forwarded for further processing to higher-order tools, e.g. logistics tools. The objective of keeping the time base synchronous for all the devices participating in the WEB-VV-multi-unit system can most easily be achieved in that all the devices receive the time information centrally from one location.

According to a further exemplary embodiment of the present invention, the method comprises the step of the server requesting the field device to carry out a comparison of clocks.

Since it is not only the field device which can initiate commencement of the communication according to the invention between the field device and the server, but since this can also be done by the server, in the latter case the server sends a command to the desired field device, with the objective of carrying out a comparison of clocks. After this the evaluation device generates, for example, an XML-file, in any case, however, a time comparison file, and furnishes this file/these files to the server, for example returns it to the WEB-VV, where the difference between the device time and the server time is checked.

According to a further exemplary embodiment of the present invention, the method may further make it possible for the server to take over the data only if it has been ensured that the time in the server and the time in the respective field device that furnishes the data are identical, or if the difference between the desired value (on the) server and the device time (in other words the current time value, i.e. at the field device or at the field-device control unit) does not exceed the threshold value.

In this and in every other exemplary embodiment of the present invention the term "identical times" or "identical time of day" means that, after taking into account various time zones in which a field device and a server can be located, the same time is kept in both devices. In this arrangement, conversion standardised to a desired standard, for example UTC, is taken into account and implemented.

By means of this step of the method according to an exemplary embodiment of the invention it may thus be possible to implement safe and reliable automated synchronisation, in process automation, of the time base of control units and field devices that are distributed worldwide, by means of a special time server. At this point and at any other point in the present application document the term "server" refers to a time server that is able to provide a time-related desired value to a connected field device by way of a network.

According to a further exemplary embodiment of the present invention, in the method at least one of the data groups of "Time comparison data" and "Data to be stored" is used in an XML-file format.

The extensible markup language (XML) is a markup language for displaying hierarchically structured data in the form of text files. Since this data is especially suitable for being exchanged between different IT systems in the internet, it may be advantageous to use this file format in the method according to the invention.

According to a further exemplary embodiment of the present invention, all the field devices in the method obtain the time information centrally by means of the server.

This server-side control and provision of the time in the field devices may provide the utmost safety and reliability in order to guard against manual operating errors in the worldwide-distributed field devices, against incorrect settings of the time zone offset within the user software of the field devices, and against the inherent time drift, which is due to technical reasons, of the clocks within the field devices. Checking the correct time setting of each field device is carried out at adequately short intervals (wherein it is of no consequence whether this process is initiated by the server or by the field device). In this way a situation can be achieved in which the time for all field devices involved is automatically kept synchronous by the server. This is not least achieved by the server checking and if necessary correcting the set time zones in each field device or in the user software of the respective field device.

According to a further exemplary embodiment of the present invention, in the method http communication is used between the server and the field devices.

The hypertext transfer protocol (http) is a protocol for transmitting data by way of a network. This protocol is primarily used in order to download web pages and other data from the world wide web to a web browser.

According to a further exemplary embodiment of the present invention, the method uses the internet as a communication- and data network.

It is in particular the reliability and worldwide availability which makes the internet an interesting network in which the data- and information exchange according to the invention is adequately made possible.

According to a further exemplary embodiment of the present invention, setting the current time value comprises both time synchronisation of the field device with correction of a real-time clock of the field device, and correction of time stamps relating to data that is produced at that time in the field device.

Since the process of storing data in a field device can be a prolonged process, i.e. a process in which data of a process receives different time information or so-called time stamps, this approach according to the invention may ensure that the data that is being produced during synchronisation also receives the correct time information. All the data of such a file, from the first to the last, thus contains the same and the correct time information, namely time information that has been adapted to the server time following synchronisation.

According to a further exemplary embodiment of the present invention, the method further comprises the step of collecting various data records with associated time stamps in the field device, as well as comprising the step of changing all the time stamps in the case of pending time synchronisation.

In contrast to the momentary storage of current data, in which storage a process image is prepared at a fixed point in time, it may also be possible to store so-called trend data or history data. In this process, for a period of time that exceeds the period of time required for a typical average reading or typical average acquisition of data, data material is collected and block-by-block is made available later. In order to make it possible for this data that has been transmitted block-by-block, this so-called trend data, to all comprise a correct time stamp, in a pending synchronisation it is not only the device time of the field device but also the trend data and thus its time stamp or time stamps that are synchronised and thus adapted to the server time.

According to a further exemplary embodiment of the present invention, the field device establishes contact with the server at predefined times by way of the communication- and data network.

With a sufficiently accurate interval or setting of the predefined times, this exemplary embodiment may make it possible to achieve synchronicity between the server and the field device except for a minimal residual risk. As an alternative, or in addition, it is also possible for the user to trigger an instant request for time synchronisation. This additional user-defined time synchronisation thus improves the possible maximum synchronicity of the system.

According to a further exemplary embodiment of the present invention, a data- and communication-network-based measuring system for measuring a fill level or a pressure and for the automatic time synchronisation is stated. In this arrangement the measuring system comprises a server, at least one field device or at least one field-device control unit, and a communication connection between the server and the at least one field device or the at least one field-device control unit for reciprocal data transmission. In this arrangement the field device or the field-device control unit is designed to determine a current time value, and the server is designed to provide a desired value. Furthermore, the server is designed to set the current time value to the desired value when the desired value differs from the current time value by more than a predetermined threshold value.

By means of this measuring system according to the invention it may thus be possible in worldwide network-based client/server systems in which the server is to receive and archive measured-value- and device information with time stamp information to ensure an indispensable uniform time basis on both sides of the system. In particular when the clients, in other words the field devices, are to collect measured-value information over an extended period of time and are to forward said information at a suitable point in time block-by-block to the server, this time-related check or time-related correction by the server may be absolutely essential. In the arrangement according to the invention the configuration of the time zones and the provision of the reference time, namely of the server time of the field devices involved, takes place only at a central location, namely only at the above-mentioned server. Both a natural technical time drift and an erroneously changed value in the time base of the field device on site is registered by the server, and during the next communication with the field device the time base is automatically set back to the desired value, namely to the system time of the server, or the correct time zone is set.

According to a further exemplary embodiment of the present invention, the measuring system is equipped with a field device that is designed to generate time comparison data, and to transmit time comparison data to the server. Likewise, the server is designed to provide a threshold value relating to the allowed time difference, and is in a position to determine the time difference between the current time value and the desired value. Likewise, the server may compare the time difference with the threshold value and decides whether the time difference is greater than or smaller than the threshold value. Furthermore, the server is designed such that it may send a reply to the field device, in which reply the field device is informed that the time of the field device is OK. Furthermore, the field device is designed to carry out time synchronisation, wherein corrections in the time stamps of data produced at that moment are carried out. Furthermore, the field device is designed such that the data which is to be stored completely can be transmitted to the server. The server in turn is designed to take over the data into a database and can acknowledge data receipt by way of the communication- and data network to the field device. Furthermore, the server is designed to send a server time to the field device and to request time synchronisation of the field device with the server. In order to be able to archive the case of synchronisation, the server comprises a so-called message buffer in which the server stores the process of "Time synchronisation in the field device".

According to a further exemplary embodiment of the present invention, a computer program for the automatic time synchronisation of field devices, namely fill-level measuring devices and pressure measuring devices as well as field-device control units in a communication- and data network, is stated, wherein the computer program when executed on a processor causes the processor to carry out the following steps: determining a current time value by the field device or by the field-device control unit, and providing a desired value in a central server. Furthermore, the step of comparing the current time value with the desired value is carried out, after which the step of setting the current time value to the desired value takes place when the desired value differs from the current time value by more than a predetermined threshold value.

According to a further exemplary embodiment of the present invention, a storage medium is stated on which a computer program for the automatic time synchronisation of field devices, namely fill-level measuring devices and pressure measuring devices as well as field-device control units in a communication- and data network is stored. In this arrangement this computer program when executed on a processor causes the processor to carry out the following steps: determining a current time value by the field device or by the field-device control unit, as well as providing a desired value in a central server. Furthermore, the step of comparing the current time value with the desired value is carried out, after which the step of setting the current time value to the desired value takes place when the desired value differs from the current time value by more than a predetermined threshold value.

According to a further exemplary embodiment of the present invention, a microprocessor is stated for the automatic time synchronisation of field devices, namely fill-level measuring devices and pressure measuring devices as well as field-device control units in a communication- and data network, and for carrying out the following steps: determining a current time value by the field device or by the field-device control unit, and providing a desired value in a central server. Likewise, the step of comparing the current time value with the desired value is carried out, and the step of setting the current time value to the desired value takes place precisely when the desired value differs from the current time value by more than a predetermined threshold value.

Further exemplary embodiments and advantages of the invention are disclosed in the subordinate claims.

Below, with reference to the figures, exemplary embodiments of the present invention are described.

DETAILED DESCRIPTION OF EXEMPLARY EMBODIMENTS

The illustrations in the figures are diagrammatic and not to scale.

In the following description of the figures the same reference characters are used for identical or similar elements.

Figure 1:
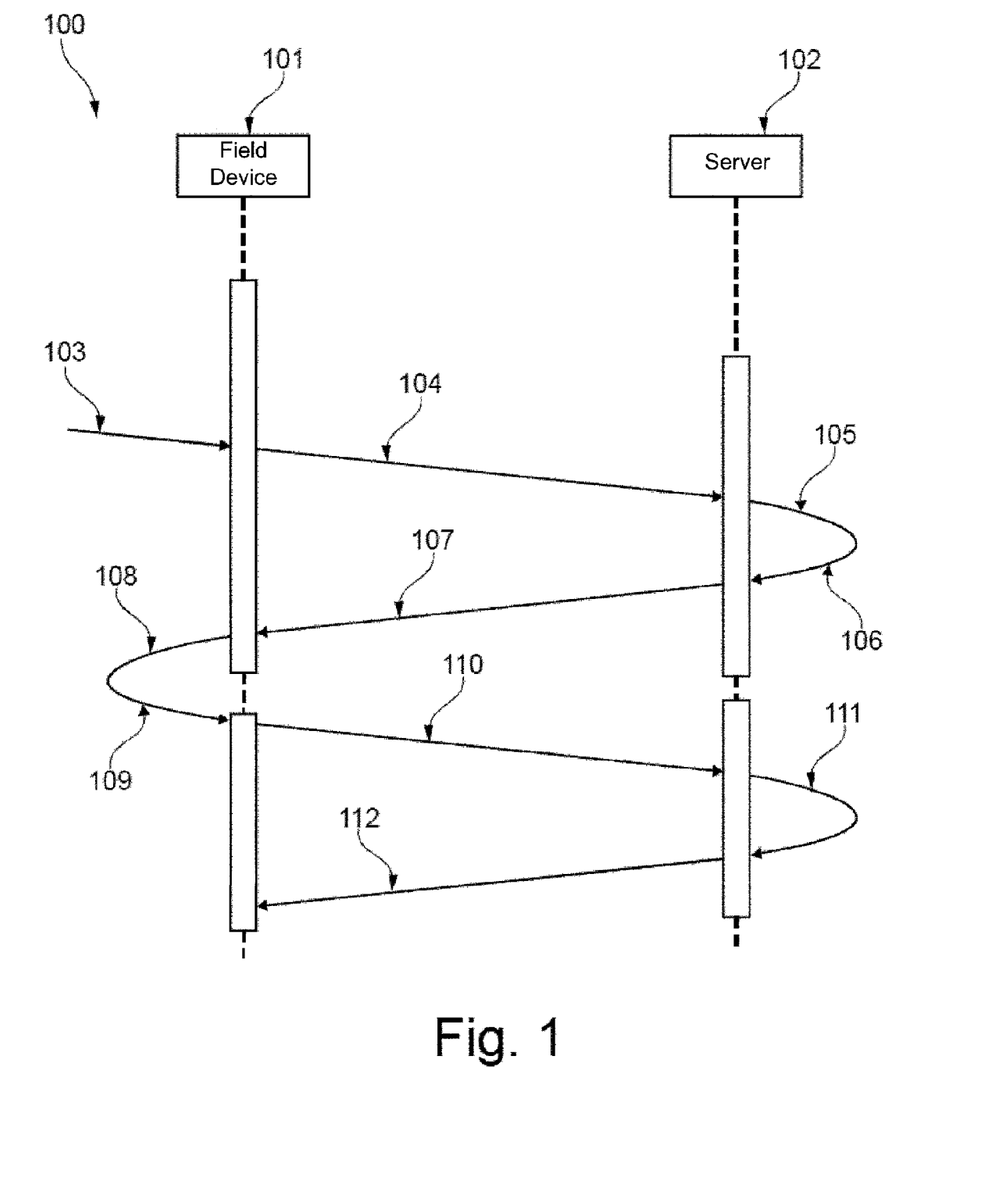
FIG. 1 shows a diagrammatic view of a method for synchronisation according to an exemplary embodiment of the present invention, wherein establishing a connection is initiated by the field device.

FIG. 1 shows a method according to an exemplary embodiment of the present invention, in which synchronisation or establishment of a connection for synchronisation is initiated by the field device. After a possible event 103 the field device or the field-device control unit 101 transmits 104 the current time value or the time comparison data to the server 102. In this arrangement the event can occur in the entire system, for example this can be an event in the WEB-VV, a so-called WEB-VV-event.

A WEB-VV-event can, for example, be an automatically generated trigger event in the field device, e.g. when the programmed point in time for sending the measured values to the WEB-VV-server has been reached.

In this arrangement the time comparison data can, for example, be present in XML-format. Thereafter the server compares 105 the current time value with the desired value and decides whether the time difference between the current time value and the desired value exceeds a certain threshold value, and whether to send a request for time synchronisation 106 to the field device 101. If the actual difference is within the limiting value, the server sends 107 the current server time "Server Date Time" back together with the "status"=DeviceTimeok. Otherwise the reply contains the current server time "Server Date Time" together with the "status"=setDeviceTime. The connection between the field device 101 and the server 102 can then be interrupted. The field device 101 then checks 108 the status sent by the server 102. Depending on the status sent, the field device needs to correct 109 the device time and the trend data. Subsequently the field device sends 110 the complete data to the server. For this purpose, if the connection was previously interrupted, a complete and independent new connection between the field device 101 or the field-device control unit and the server 102 is established. Thereafter the server 102 takes over 111 the data. Subsequently the server 102 acknowledges 112 receipt of the file.

Figure 2:
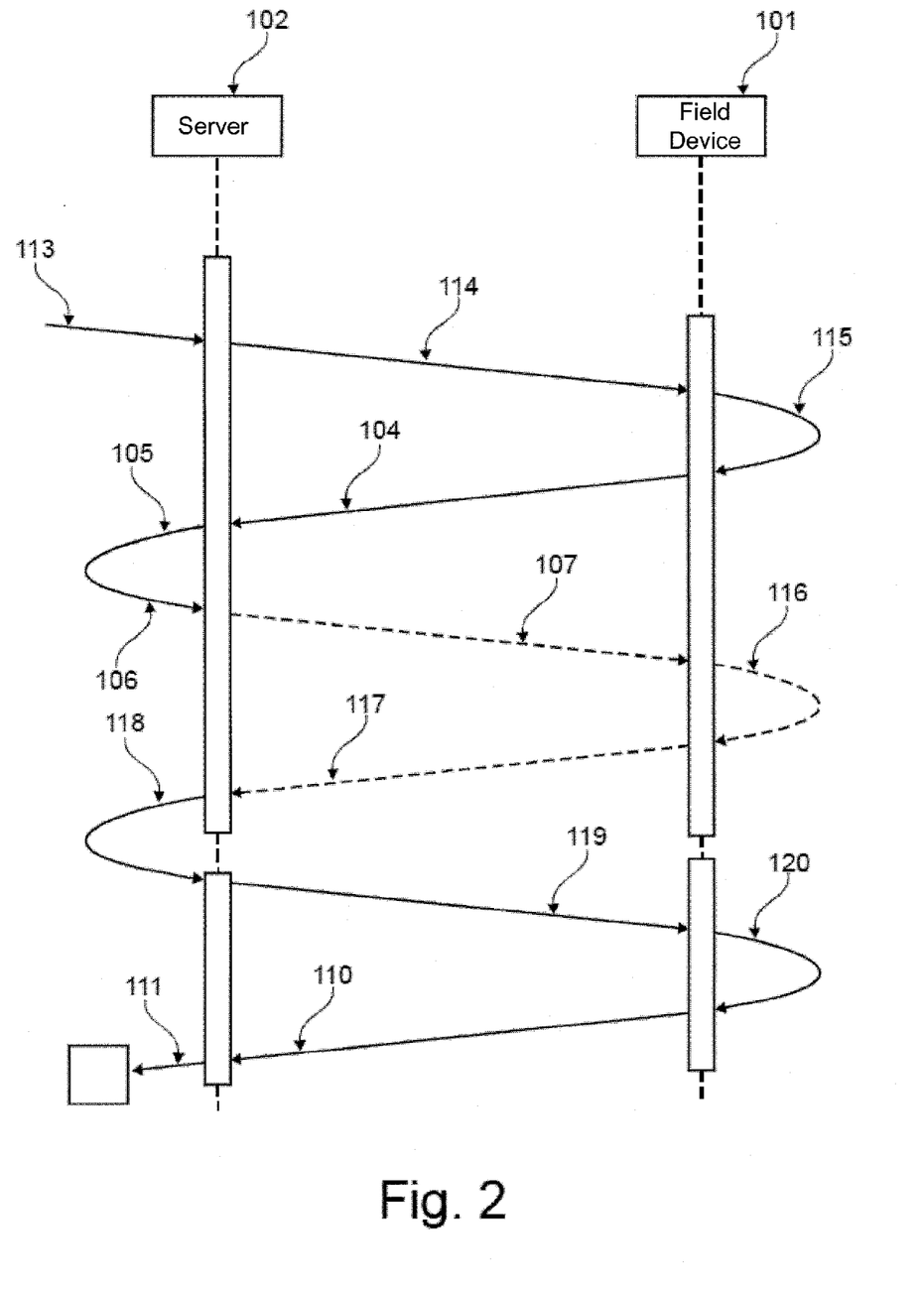
FIG. 2 shows a diagrammatic view for synchronisation according to an exemplary embodiment of the present invention, wherein establishing a connection is initiated by the server.

FIG. 2 shows a diagrammatic view of the synchronisation method according to an exemplary embodiment of the present invention, wherein, in the exemplary embodiment shown, establishing the connection is initiated by the server. After a preceding event 113 (e.g. after an interaction of the WEB-VV-user), the server 102 commences with a request 114 for the comparison of clocks, to the field device 101. In response to this the field device 101 reacts by generating 115 the current time value or the current time comparison data. Furthermore, the field device 101 sends 104 the current time value or the time comparison data to the server. The server in turn compares 105 the current time value with the desired value. Depending on the result of the comparison, i.e. depending on whether this time difference is greater than or smaller than a predefined threshold value, a request for time synchronisation 106 is issued. In this process the server 102 sends 107 the current server time "Server Date Time" together with the "status"=setDeviceTime and thus requests the field device to carry out time synchronisation. The field device 101 in turn reacts with a correction 116 of the device time and of the trend data. Likewise the field device 101 sends an acknowledgment 117 to the server, by way of the data- and communication network, confirming that so far everything is OK, e.g. an http-status 200, and thus acknowledges the correction of the device time and of the trend data.

In this process the event "Time synchronisation in the field device" is stored 118 in the message buffer in the server 102. Then follows the transmission of a request 119 for data exchange. A request for generating measured-value data is thus issued 120 to the field device 101, whereupon the field device 101 causes data exchange 110 to the server 102. The data is dispatched by way of the data- and communication network and is taken over 111 by the server 102.

Figure 3:
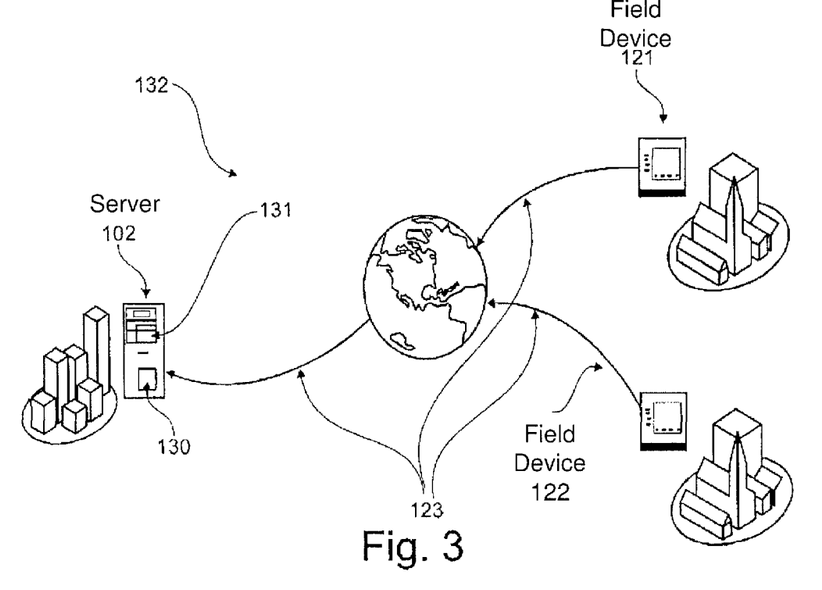
FIG. 3 shows a diagrammatic view of a communication- and data network, in which an exemplary embodiment of the method according to the invention is implemented.

FIG. 3 shows a diagrammatic measuring system according to an exemplary embodiment of the present invention, with a server 102 comprising a storage medium 130 and a CPU, i.e. a microprocessor 131. Likewise, the communication- and data network 123, on which the method according to the invention is based, is shown, and in an exemplary manner two globally distributed field devices 121 and 122 are shown. It is thus possible, with the method according to the invention, by way of the communication- and data network 123 to implement secure automatic synchronisation of the time base of these worldwide-distributed control units 121 and 122 in process automation by means of a special time server 102. In this arrangement the control units or field devices or the clients and the server can use the internet as an exemplary design of the data- and communication network 123.

Figure 4:
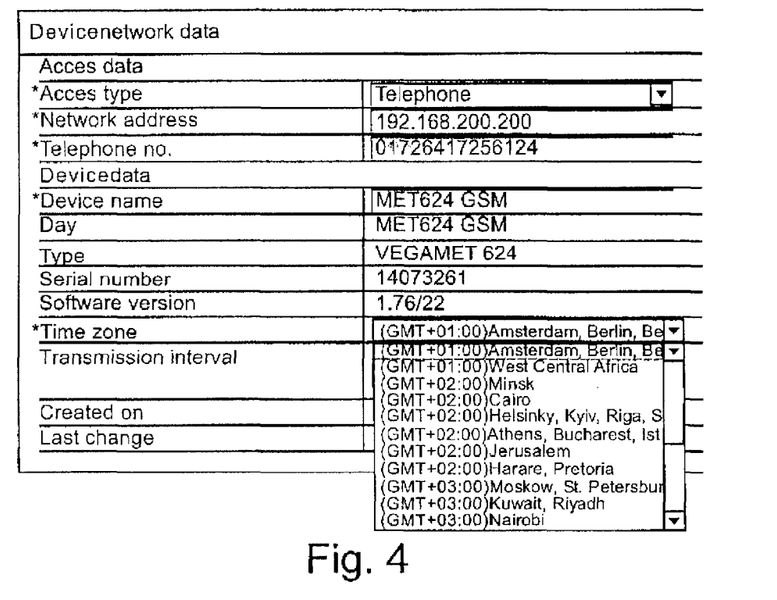
FIG. 4 shows a possible view of the user software of the server for setting the device-network access data for a field device.

In an exemplary manner FIG. 4 shows the interface of user software of the server for setting the device network-access data for a field device of the method according to an exemplary embodiment of the invention. FIG. 4 clearly shows that the respective time zone in which the given field device is located is shown. It is, however, important that the time zone is set and controlled by the server centrally and worldwide by means of the method according to the invention. In this way safe and reliable performance concerning the synchronicity of all the field devices with the server, and the correct time zone setting in all external field devices, can be ensured. If a user were to change the time zone setting, this would be detected by the server during the next communication by way of the communication- and data network, and during the same communication it would be rectified and re-set to the original time zone value, which was the correct value. If such synchronisation has to take place, then this is archived in a message buffer on the server.

Figure 5:
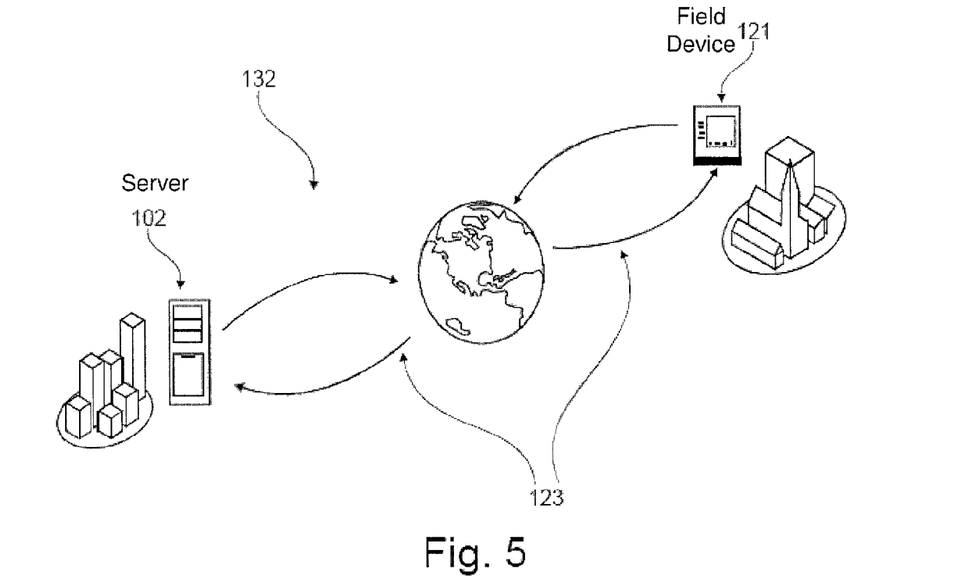
FIG. 5 shows a diagrammatic view of a communication- and data network in which an exemplary embodiment of the method according to the invention is implemented.

FIG. 5 diagrammatically shows a measuring system 132 according to the invention, comprising a server 102 and a field device or a field-device control unit 121. The diagram clearly shows that both sides of the measuring system according to the invention can initiate establishing contact with the opposite side, which is shown by the arrows pointing outward from the respective initiator. Establishing contact takes place by way of the communication- and data network 123.

Figure 6:
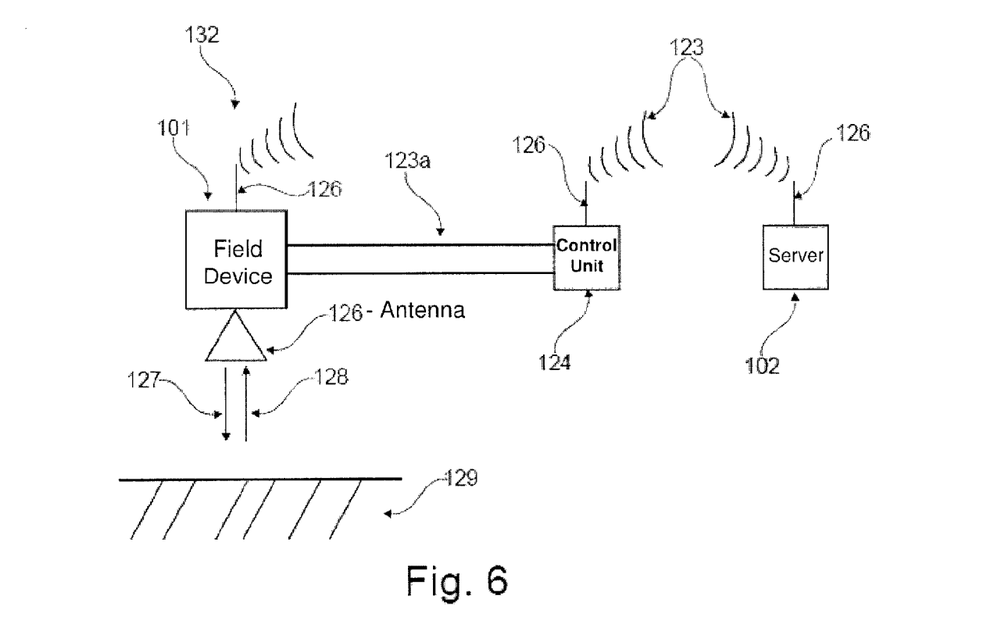
FIG. 6 shows a diagrammatic view of a measuring system according to an exemplary embodiment of the present invention.

FIG. 6 diagrammatically shows the measuring system 132 according to the invention, which measuring system 132 comprises a field device 101 and a connection 123a, e.g. in the form of a 4 . . . 20 mA conductor loop to the field-device control unit 124. The server 102 comprises an antenna 126, as do the field-device-control unit and the field device. This antenna represents the connection to the communication- and data network 123 in an exemplary manner. Instead of, or in addition to, a wireless connection, it is also possible to have a wire-bound connection. The diagram further shows that the field device 121 comprises a further, second, antenna 126, in the diagram arranged further below, which antenna 126 in this case is designed to measure the fill level or the pressure. The diagram shows a transmit signal 127 and a receive signal 128, which signals verify the fill level of the feed material 129.

Figure 7:
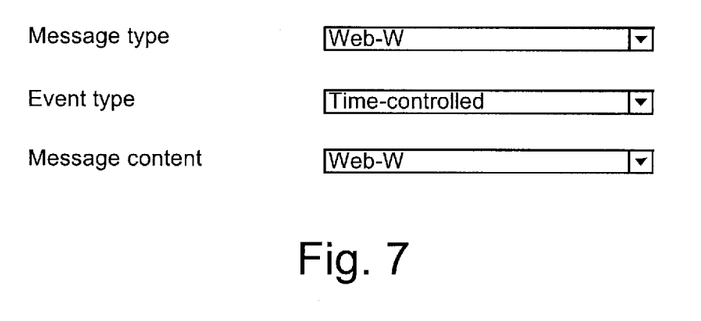
FIG. 7 shows a diagrammatic view of a dialog of the field-device user software.
Figure 8:
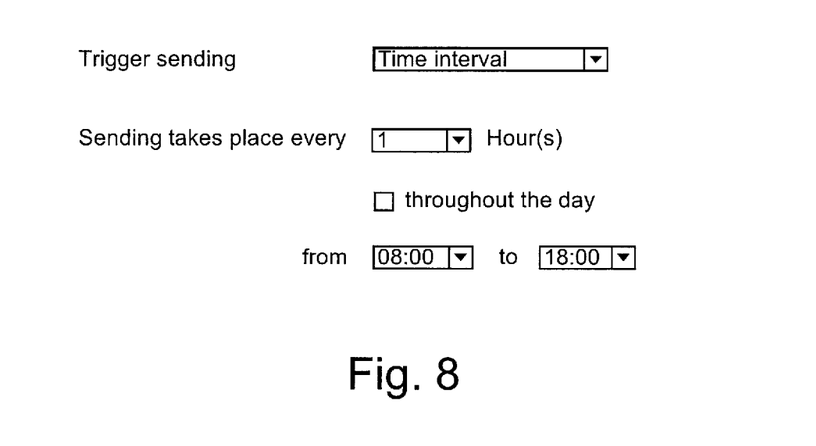
FIG. 8 shows a diagrammatic view of a dialog of the field-device user software.

FIGS. 7 and 8 show diagrammatic views of dialogues of the field-device user software. FIG. 7 shows that part in which the notification type is defined. In contrast to this, FIG. 8 shows the part which determines the point in time of transmission for dispatching messages. The diagram shows that the polling interval is displayed, wherein according to the invention this can be set in a secure manner on the server side.

The method according to an exemplary embodiment of the present invention may make it compulsory for the person responsible for the server to set the time zone for each of the clients involved, wherein this is required centrally and only on the server side.

If the time base of a client is changed on site by mistake, the server registers this during the next communication with the client, and the time basis in the client is automatically reset to the desired value.

The arrangement according to the invention can, for example, be used in the web-based measured-value acquisition- and visualisation system "WEB-VV". In this arrangement there is a differentiation between the two communication sides, namely on the one hand the server, also designated WEB-VV, and on the other hand the devices or clients or field devices.

The server, for example WEB-VV, obtains its measured-value information with associated time stamps from a multitude of evaluation devices (clients) for each file. This can, in particular, be an XML-file. Furthermore, the server stores this information centrally in a database. The stored data can be combined as desired in the WEB-VV-server, and by way of browser access can be displayed as so-called measured-value displays, or can be forwarded for further processing to higher-order tools, for example to logistics tools.

Apart from supplying process images with time stamps (time stamps equate to momentary recordings of the measured values), the evaluation devices can also supply history data comprising time stamps as a file, for example in the form of XML-files.

In order to ensure sensible comparison options or the ability to further process the multitude of measured values, it may be important that a uniform time base is provided for all the stored values. FIG. 3 diagrammatically shows a WEB-VV-system.

The objective of keeping the time base synchronous for all the devices involved in the multi-unit WEB-VV-system may be achieved most easily in that all the devices receive the time information centrally from one point. The server communicates with the evaluation devices by way of four types of services, wherein in the first variant communication is initiated by the evaluation device. The service "Transmit measured value" is thus initiated by the evaluation device. The services "Scan device network, Update measured value, and Set interval for WEB-VV event" are initiated by the server. In each case http communication can be used, which makes it possible for both sides to obtain time information from the counterpart, and to use this information correspondingly. Since the evaluation devices may be located in various time zones, this information has to be manually communicated in a one-off manner to the WEB-VV when a device network is first set up. This takes place by way of a configuration dialog in WEB-VV, which configuration dialog has been prepared for this purpose (see FIG. 4).

In this way WEB-VV is able to return its current time of day in a corrected manner to the local time of day of the evaluation devices (see FIG. 5).

As mentioned above, both the evaluation devices and the WEB-VV-servers transmit their time information to the respective counterpart during each connection, except in the case of the service "Scan device network". However, a decision as to whether time synchronisation in the evaluation device is to be carried out is exclusively made by the server, in this case by WEB-VV. If required, the server requests that the evaluation device carry out synchronisation.

WEB-VV checks the device information of incoming data, for example of XML-measured-value data, and compares this data with the current computer time, i.e. with the time of the server.

The evaluation devices store time stamp information together with the individual measured values in the structure <Values> in the measured-value data, in this case in the XML-measured-value data. This time stamp information signifies the point in time at which a measured value was acquired in the evaluation device and stored in the intermediate storage device.

In addition, the evaluation devices furnish time information in the structure <Device>. This time information furnishes the current time of day in the evaluation device at the point in time of data exchange with the server, in other words with WEB-VV.

Apart from a personal name of the field device preparing the data, the element "Device" of the XML-measured-value data also comprises the types and version designation as well as a serial number and the IP address. Of course, the precise local time with date is entered in the file; this being the most important content of this measured-value data.

For example: <Device tag "My MET", type="VEGA Scan 693", version="1.75/12", serial="11111111", IP Address="172.16.40.4", Time="2006-07-26, 10:38:38">.

In certain cases, purely for the purpose of time synchronisation, the XML-element Device can also be sent without the measured-value information. In this case the content of the XML-file is designated XML-time comparison data.

In order to check the computer time and the device time, WEB-VV converts both time information segments to UTC (Universal Time Coordinated). Conversion of the computer time takes place on the basis of the Windows country-settings, while conversion of the device time "Time" of the evaluation device takes place on the basis of the time zone allocation of the device network in the server.

Generally speaking, WEB-VV takes the measured value over into the database together with the time stamps transmitted in the XML-file, wherein they are archived so as to be standardised according to UTC.

After the server has completely received the data, said server, together with the http status, returns in its response the server time corrected to the local time zone of the evaluation device.

The following applies to the entire above part of the description and to the entire following part: the term WEB-VV has been used as an example of a server that is able to carry out implementation according to the invention of a method for the automatic time synchronisation of devices in network-based systems.

Since the various communication options between the server and the field devices differ as far as their initiation is concerned (synchronisation initiated by the evaluation device, or synchronisation initiated by the server), below, in each case one example from each of these two groups is described in detail.

The activation of the WEB-VV function within an evaluation device is a basic prerequisite for interaction of evaluation devices with WEB-VV. Generally speaking, in the evaluation device the function enabling communication with the system or with the server software is set. This takes place by way of the two dialogs, shown in FIGS. 7 and 8, of the evaluation-devices user software, preferably presented by a device type manager according to the specifications of FDT (Field Device Tool). Accordingly, in the example shown, the evaluation device would automatically send measured value files every hour between 8 a.m. and 8 p.m. local time to the server WEB-VV. The diagram clearly shows that the frequency at which synchronisation takes place can be set.

The function "Transmit measured values" to the server or WEB-VV by way of the evaluation device starts with a time comparison according to a comparison command. To this effect only the time comparison data, in other words the current time value, is sent, wherein in the case of XML-time comparison data its content is essentially limited to the XML-element Device:

```
<?xml version="1.0" encoding="iso-8859-1"?>
<VEGA version="1.0">
<DeviceNetwork>
< Device tag = "My MET", type = "VEGA Scan 693",
version = "1.75/12", serial = "11111111",
IP Address = "172.16.40.4", Time = "2006-07-26, 10:38:38"
</Device>
</DeviceNetwork>
</VEGA>
```

In a WEB-VV configuration file a parameter for defining the allowed time difference of the evaluation devices is provided. The standard value is entered, for example as two minutes, wherein this value can be altered. If the actual difference is within the limiting value, the server, in other words WEB-VV, returns the current server time "Server Date Time" together with the status: "Device Time OK". Otherwise, the reply comprises the current server time "Server Date Time" together with the status "Set Device Time". The procedure "Time synchronisation in the evaluation device" is entered in the message buffer "Messages/events" of the supervisor, in other words entered in a part of the server.

Depending on the content of the reply or of the command of the server, in other words depending on the content of the XML-element "Status", the evaluation device then carries out time synchronisation. After completion of time synchronisation, the actual data exchange, in other words the transfer of the complete data, for example of the complete XML-measured-value data, to the server is triggered with a command, for example with Post 2 " . . . /DataExchange.aspx". The server takes the measured-value data over into the database and acknowledges receipt of the file with the http-status 200, wherein in this case there is no need for the XML-response. This completes synchronisation in which establishing a connection is initiated by the evaluation device.

Below, an example of synchronisation is provided in which establishing a connection is initiated by the server.

The server, in this case the WEB-VV-server, starts communication with a request for the comparison of clocks by way of a command, for example " . . . /webvv/webvv.xml?type=timeExchange". The evaluation device generates the time comparison data or the current time value or the XML-time comparison data, and returns this to WEB-VV, where the difference between the device time and the server time is checked.

If the actual difference is within the limiting value, then WEB-VV skips any action for synchronising the device clock, and by means of a command immediately requests transmission of the measured-value data of the evaluation device. This takes place, for example, with " . . . /webvv/webvv.xml?type=dataExchange".

The measured-value data generated by the evaluation device is taken over into the database after it has arrived in the WEB-VV-server.

If the actual time difference is outside the limiting value, then WEB-VV, with a command comprising the current server time "Server Date Time" together with the "status" equals "Set Device Time", requests the evaluation device to carry out time synchronisation. The procedure "Time synchronisation in the evaluation device" is entered in the message buffer "Messages/events" of the supervisor. After time synchronisation has been completed, the actual measured value data is requested, as set out above, and transmitted. This ends the synchronisation example of communication that was initiated by the WEB-VV-server.

Additional mechanisms of the client, which mechanisms relate to the system time of the client, are implemented as an additional safety measure in order to ensure an identical time base. For example, the system time of the clients (evaluation devices) that are integrated in the multi-unit server system is centrally administered by way of the server. Accordingly, the local system time must no longer be able to be influenced. In order to achieve this, the following software function is implemented. Any change in the system time is barred when a WEB-VV-event for the device is established and activated. In this context the term WEB-VV-event refers to the general setting within the field device or within the field-device control unit for the network-based time synchronisation by an external server. The bar applies to key operation on the operating unit of the evaluation device, as well as to the operation, by way of the user software (e.g. device type managers, DTM). Furthermore, the evaluation device issues a message on the device's own display if a user attempts to edit the active bar as far as the time of day and the date are concerned. If time synchronisation is triggered in an evaluation device by a WEB-VV-command, or if a WEB-VV-response is triggered, the time stamps for the complete ongoing record and for the real-time clock are corrected.

Table 1 below shows relevant server responses or WEB-VV responses:

TABLE 1

| Evaluation device | WEB-VV response | Reaction in the evaluation device |
|---|---|---|
| Comparison of clocks at "Transmit measured values" with: <IP>/Web-VV/InBox/TimeExchange.aspx | Http-status e.g. 200 ...... <Response> <ServerDateTime>2005-10-18 10:20:12 </ServerDateTime> <Status>setDeviceTime </Status> </Response> | Correct real-time clock and Correct *.GND time stamp |

Table 2 below shows exemplary relevant commands with reference to the example of WEB-VV.

TABLE 2

| WEB-VV command | Reaction in the evaluation device |
|---|---|
| http://<IP>/webvv/webvv.xml?type=scanNetwork | No time correction |
| http://<IP>/webvv/webvv.xml?type=dataExchange | No time correction |
| http://<IP>/cgi/webvv/webvv.xml?type=setInterval | No time correction |
| http://<IP>/cgi/webvv/webvv.xml?type=setTime | Correct real-time clock and Correct *.GND time stamp |

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

| List of reference characters | |
|---|---|
| 100 | Method for automatic time synchronisation |
| 101 | Field device/field-device control unit |
| 102 | Server |
| 103 | Server event |
| 104 | Transmit the current time value/the time comparison data |
| 105 | Compare the current time value with the desired value |
| 106 | If required, request for time synchronisation |
| 107 | Transmit the status together with the server time |
| 108 | Check status |
| 109 | If required, correct device time and trend data |
| 110 | Data exchange |
| 111 | Inward data transfer |
| 112 | Acknowledge receipt of file |
| 113 | Previous event e.g. Update measured value |
| 114 | Request for the comparison of clocks |
| 115 | Generate current time value/time comparison data |
| 116 | Correct device time and trend data |
| 117 | Send confirmation that so far everything is OK, e.g. http status 200 |
| 118 | Store the event "Time synchronisation in the field device" in the message buffer of the server |
| 119 | Request for data exchange |
| 120 | Generate measured-value data |
| 121 | Field device 1 |
| 122 | Field device 2 |
| 123 | Data- and communication network |
| 123a | Connection to the control unit |
| 124 | Field-device control unit |
| 126 | Antenna |
| 127 | Transmit signal |
| 128 | Receive signal |
| 129 | Feed material |
| 130 | Storage medium |
| 131 | CPU |
| 132 | Measuring system |

The invention claimed is:

1. A method based on a communication and data network for automatic time synchronization of fill-level measuring devices, pressure measuring devices, and field control units by a central server, comprising:
    determining a current time value by at least one of the fill-level measuring devices, the pressure measuring devices, and the field control units;
    transmitting the current time value to the server;
    providing a desired value in the central server;
    comparing the current time value with the desired value by the central server, the comparing being performed at the server;
    wherein the server ensures that a correct conversion of the current time of day of the at least one of the fill-level measuring devices, the pressure measuring devices and the field control units is carried out,
    when the desired value differs from the current time value by more than a predetermined threshold value, requesting, by the server, the at least one fill-level measuring device, pressure measuring device, and field control unit to carry out the time synchronization, after which that at least one fill-level measuring device, pressure measuring device, and field control unit sets the current time value to the desired value.
    wherein the server takes over data from at least one of the fill-level measuring devices, the pressure measuring devices, or the field control units into a database only when the desired value differs from the current time value at most by the predetermined threshold value.

2. The method according to claim 1, wherein the fill-level measuring devices including at least two of pressure measuring devices and fill-level measuring device control units.

3. The method according to claim 1, further comprising:
    transmitting the current time value by the fill-level measuring device to the server; and
    determining a time difference between the current time value and the desired value.

4. The method according to claim 1, further comprising:
    sending a reply by the server to the fill-level measuring device, the reply being indicative that the system time of the fill-level measuring device is acceptable if the desired value differs from the current time value at most by the predetermined threshold value;
    transmitting all the data to be stored from the fill-level measuring device to the server; and
    acknowledging receipt of the data by the server.

5. The method according to claim 1, further comprising:
    transmitting a server time to the fill-level measuring device;
    issuing a request for time synchronization of the fill-level measuring device with the server; and
    storing the process of "Time synchronization in the field device" in a message buffer on the server.

6. The method according to claim 1, wherein the method is implemented in an acquisition system WEB-VV.

7. The method according to claim 1, further comprising:
requesting, by the server, the fill-level measuring device to carry out a comparison of clocks.

8. The method according to claim 1, further comprising:
only if the time in the server and the time in the fill-level measuring device are identical, permitting the server to take over the data.

9. The method according to claim 1, wherein at least one of the data groups of "Time comparison data" and "Data to be stored" is used in an XML-file format.

10. The method according to claim 1, wherein the fill-level measuring devices obtain the time information centrally using the server.

11. The method according to claim 1, wherein http communication is used between the server and the fill-level measuring devices.

12. The method according to claim 1, wherein the communication- and data network includes the Internet.

13. The method according to claim 1, wherein setting the current time value comprises time synchronization of the fill-level measuring device with correction of a real-time clock of the fill-level measuring device, and with correction of time stamps relating to data that is produced at that time in the fill-level measuring device.

14. The method according to claim 1, further comprising:
collecting various data records with associated time stamps in the fill-level measuring device; and
changing all the time stamps in the case of time synchronization.

15. The method according to claim 1, wherein the fill-level measuring device establishes contact with the server at predefined times using the communication- and data network.

16. A data and communication-network-based measuring system for measuring one of a fill level and a pressure and for the automatic time synchronization, comprising:
a server;
at least one of a fill-level measuring device, a pressure measuring device, and a field control unit determining a current time value;
a communication connection between the server and the at least one fill-level measuring device, pressure measuring device, and field control unit for mutual data transmission;
wherein the server provides a desired value in the server, compares the current time value with the desired time value at the server, and sets the current time value to the desired value when the desired value differs from the current time value by more than a predetermined threshold value,
wherein the server ensures that a correct conversion of the current time of day of the at least one of the fill-level measuring devices, the pressure measuring devices and the field control units is carried out,
wherein the server takes over data from at least one of the fill-level measuring devices, the pressure measuring devices, or the field control units into a database only when the desired value differs from the current time value at most by the predetermined threshold value.

17. The measuring system according to claim 16, wherein the at least one fill-level measuring device includes a fill-level measuring device control unit.

18. The measuring system according to claim 16, wherein the at least one fill-level measuring device generates and transmits time comparison data to the server, the server providing a threshold value relating to an allowed time difference and determining a time difference between the current time value and the desired value; the server comparing the time difference with the threshold value and determining if the time difference is one of greater than and smaller than the threshold value, the server sending a reply to the at least one fill-level measuring device, the at least one fill-level measuring device transmitting a reply to the server, the reply being indicative if the time of the at least one fill-level measuring device is acceptable, the at least one fill-level measuring device carrying out time synchronization with a correction of time stamps of data produced at that moment being carried out in the at least one fill-level measuring device, the at least one fill-level measuring device transmitting to the server the data which is to be stored completely, the server taking over the data into a database, the server acknowledging data receipt via the communication and data network to the at least one fill-level measuring device, the server sending a server time to the at least one fill-level measuring device and requesting time synchronization of the at least one fill-level measuring device with the server and the server comprising a message buffer in which the server stores the process of "Time synchronization in the field device".

19. A computer readable storage device including a set of instructions executable by a processor for automatic time synchronization of fill-level measuring devices, pressure measuring devices, and field control units by a central server in a communication and data network is stored, the set of instructions operable to:
determine a current time value by at least one of the fill-level measuring devices, the pressure measuring devices, and the field control units;
provide a desired value in the central server;
compare the current time value with the desired value by the central server, the comparison being performed at the server;
request, by the server, the at least one fill-level measuring device, pressure measuring device, and field control unit to carry out the time synchronization;
set, by the fill-level measuring devices, the pressure measuring devices, and the field control units, the current time value to the desired value when the desired value differs from the current time value by more than a predetermined threshold value,
wherein the server ensures that a correct conversion of the current time of day of the at least one of the fill-level measuring devices, the pressure measuring devices and the field control units is carried out,
wherein the server takes over data from at least one of the fill-level measuring devices, the pressure measuring devices, or the field control units into a database only when the desired value differs from the current time value at most by the predetermined threshold value.

20. The computer readable storage device according to claim 19, wherein the fill-level measuring devices includes one of at least one pressure measuring device and at least one fill-level measuring device control unit.

21. A microprocessor device for the automatic time synchronization of fill-level measuring devices, pressure measuring devices, and field control units by a central server in a communication and data network, and for carrying out the following steps:
determining a current time value by at least one of the fill-level measuring devices, the pressure measuring devices, and the field control units;
providing a desired value in the central server;
comparing the current time value with the desired value by the central server, the comparing being performed at the server;

requesting, by the server, the at least one fill-level measuring device, pressure measuring device, and field control unit to carry out the time synchronization;

setting, by the fill-level measuring devices, the pressure measuring devices, and the field control units, the current time value to the desired value when the desired value differs from the current time value by more than a predetermined threshold value, wherein the server ensures that a correct conversion of the current time of day of the at least one of the fill-level measuring devices, the pressure measuring devices and the field control units is carried out, wherein the server takes over data from at least one of the fill-level measuring devices, the pressure measuring devices, or the field control units into a database only when the desired value differs from the current time value at most by the predetermined threshold value.

22. The microprocessor device according to claim 21, wherein the fill-level measuring devices includes one of at least one pressure measuring device and at least one fill-level measuring device control unit.

* * * * *